April 27, 1954  C. H. McADIE  2,677,086
CIRCUIT FOR PHASE SENSITIVE SERVO AMPLIFIERS
Filed Dec. 29, 1951

WITNESSES:
John E. Hensley
R. D. Brodshl

INVENTOR
Colin H. McAdie
BY
J. E. Browder
ATTORNEY

Patented Apr. 27, 1954

2,677,086

UNITED STATES PATENT OFFICE 2,677,086

CIRCUIT FOR PHASE SENSITIVE SERVO AMPLIFIERS

Colin H. McAdie, Baltimore, Md., assignor to Westinghouse Electric Corporation, East Pittsburgh, Pa., a corporation of Pennsylvania Application December 29, 1951, Serial No. 264,195

6 Claims. (Cl. 318—207)

My invention relates to arrangements for reversing at will the phase of alternating current which is caused to flow between output terminals of an alternating-current network by a voltage impressed on the supply terminals of that network. This arrangement is particularly useful where the aforesaid output terminals are connected to one phase-winding of a two-phase servo-amplifier motor, the other phase winding of which draws alternating current from the circuit connected to the said supply terminals. In such an arrangement the direction of rotation of the servo-amplifier is reversed when the phase of current at the output terminals is reversed.

Figure 1:
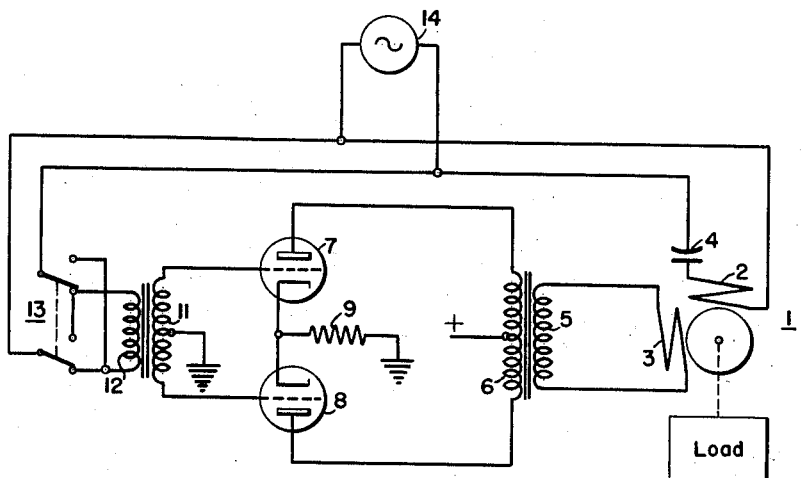

Circuits, of which Fig. 1 herein is typical, have been devised in which a servo-motor controlling some mechanism can be caused to rotate at will either clockwise or counterclockwise by reversing the phase of the alternating voltage impressed on a set of control grids, by means of a reversing switch or the like. In such arrangements, the grid-controlled tubes have needed direct-current voltage supplies for their plates and in many cases power-requirements are high enough so that the direct-current voltages needed are inconveniently high. Furthermore, in many instances, a considerable number of servo-amplifiers are needed in a system and difficulties arise from common coupling and interference through use of a single direct-current voltage supply for the tubes of the various servo-amplifiers.

My invention comprises a novel circuit in which alternating voltage is used for plate-voltage of the servo-amplifier tubes, thus making it possible to use a separate transformer-secondary if desired, for each servo-amplifier plate-supply and making it possible also to avoid the above-mentioned tendency to cross-interference between different amplifiers as well as to cheaply provide plate-voltages of any desired magnitude.

One object of my invention is accordingly to provide a new and improved servo-amplifier control circuit which shall avoid the necessity for providing a supply of direct current for the plate-circuits of the amplifiers.

Another object is to provide a servo-amplifier control system in which numerous amplifier units may be embodied without serious difficulty from cross-interference between the amplifiers.

Still another object is to provide a novel amplifier network embodying a pair of push-pull connected grid-controlled discharge tubes in which an alternating voltage impressed on input terminals coupled to the control grids will cause a full-wave alternating current of the same frequency to flow in an output circuit, the phase of said alternating current changing through 180 electrical degrees when the phase of said alternating voltage is changed through 180 electrical degrees.

Yet another object of my invention is to provide an amplifying tube network having two alternating voltages of the same frequency impressed respectively on two input terminals, and in which a change of 180 electrical degrees in the phase of said alternating voltages relative to each other will change by 180 electrical degrees the phase of the voltage across a pair of output terminals relative to one of them.

Figure 2:
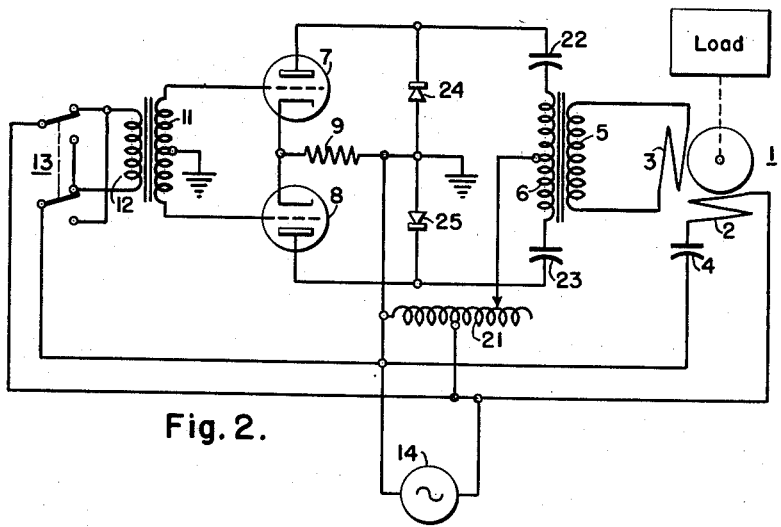

Other objects of my invention will become apparent upon reading the following description taken in connection with the drawings, in which:

Figure 1 is a circuit diagram of a servo-amplifier control-circuit of the prior art, and Fig. 2 is a similar diagram of a servo-amplifier control circuit embodying the principles of my invention.

Referring in detail to Fig. 1, a servo-motor which may be a two-phase induction motor 1 is provided with windings 2 and 3 displaced from each other by one-half of the space between successive poles on the stator. Winding 2 is fed from an alternating voltage source through a capacitor or equivalent element 4 while winding 3 is fed from the secondary 5 of a transformer having a primary 6 which is connected between the anodes of a pair of push-pull connected grid-controlled electrical discharge tubes 7, 8. The common cathodes of the tubes 7, 8 are connected to ground through a resistor 9, while a direct-current voltage source (not shown) is connected with its negative terminal to ground and its positive terminal to the mid-tap of primary 6. The control grids of tubes 7 and 8 are respectively connected to the opposite ends of a transformer secondary 11 having a primary 12 connected through a reversing switch 13 to the same alternating-current source 14 that supplies the motor-winding 2. A mid-tap of the secondary 11 is connected to ground.

The mode of operation of the Fig. 1 circuit is substantially as follows. When switch 13 is closed in one of its two positions the alternating voltage from source 14 will make the control-grids of tubes 7 and 8 alternately positive, and so cause pulses of current to flow from the direct-current source first through one-half and then through the other half of winding 6 to drive through secondary 5 and winding 3 an alternating current having the same frequency as supply 14. Supply 14 will also send a current through capacitor 4 and motor-winding 2 which will be substantially 90 electrical degrees out of phase with that in motor-winding 3; and the effect of the currents in motor-windings 2 and 3 will be to set up a rotating magnetic field in the air-gap of motor 1 which will rotate its armature in the same direction that the field moves. The motor 1 will thus rotate any mechanism, such as a tuning capacitor rotor, to which it may be attached.

If now it is desired to rotate the motor 1 in the opposite direction, the switch 13 is opened and reclosed in the reverse direction, thus changing through 180 electrical degrees the phase of the alternating voltage it impresses on the control-grids of tubes 7 and 8. As a result the phase of the alternating voltage impressed on motor-winding 3 will be changed by 180 electrical degrees relative to the voltage impressed by source 14 on winding 2. The direction of rotation of the magnetic field in the air gap of motor 1 will be reversed, and also the rotor of that motor will turn in the opposite direction to the direction in which it moved before switch 13 was reversed.

As previously pointed out, the electrical characteristics of commercial tubes such as 7 and 8 make it necessary, in many applications of servo-motors, that the direct-current source supplying plate-current shall be of inconveniently high value; and where a number of servo-motors are used together, their connection to a single source of direct-current, which would otherwise be desirable, causes some cross-interference of one motor with another. For these reasons, the circuit shown in Fig. 2, using the source of alternating voltage which supplies the motor winding 2, has been found to be an improvement of the Fig. 1 circuit.

In Fig. 2, the motor 1, its windings 2, 3, capacitor 4, transformer windings 5, 6, tubes 7, 8, resistor 9, transformer windings 11, 12, switch 13 and source 14 are the same as in Fig. 1 and so it is believed unnecessary to repeat that description here. However, the direct-current source of Fig. 1 is replaced in Fig. 2 by the variable-tap secondary winding 21 of an auto-transformer which is fed from the alternating-current supply 14. Also the respective ends of transformer-winding 6 are connected in series with capacitors 22, 23 and thence to ground by a pair of half-wave rectifiers 24, 25 which may be of either the diode or dry-contact type, each rectifier being poled so that it is non-conductive when the anode of its adjacent tube, 7 or 8, is positive.

The mode of operation of the Fig. 2 circuit is substantially as follows. The anodes of tubes 7 and 8 are both positive on one half-cycle of source 14, and both negative on the following half-cycle. On the first-mentioned half-cycle the closure of switch 13 makes the control-grid of one tube, let us say tube 7, positive and the control-grid of the other tube 8 negative. Tube 7 alone will thus conduct current on that half-cycle from source 21 through the upper half of transformer-winding 6. This will induce a voltage in transformer-winding 5 and motor winding 3; and the latter, together with motor-winding 2 will set up a rotating magnetic field in the air-gap of motor 1 to turn its rotor. On the next half-cycle while the control-grid of tube 8 is positive, the voltage impressed on the anodes of both tubes 7 and 8 by source 21 is negative so that they remain non-conductive. However, the voltage of source 21 is so poled that rectifier 24 is conductive to it and carries current through winding 6 during the second half wave of voltage impressed by source 21 in the opposite direction to that passing that winding during the preceding half-circle. The winding 6 thus carries both half-waves of alternating current and sends full-wave current to motor winding 3.

If now it is desired to reverse the rotation of motor 1, switch 13 is closed in the reverse position so that it renders tube 8 conductive, and tube 7 non-conductive, during those half-cycles when source 13 makes their anodes positive. It is believed clear without detailed description that the system will behave as described above except that tube 8 and rectifier 25 will behave as tube 7 and rectifier 24 are described as doing above, and that the magnetic field due to the lower half of winding 6 will induce voltages which are exact opposites of (i. e., which are 180 electrical degrees different in phase from) those induced in the system by the upper half of transformer-winding 6 as described above. Changing the phase of voltage in motor-winding 3 reverses the direction of rotation of the magnetic field, and the rotor of motor 1.

It will be noted that the transformer windings 5, 6, 11, 12, tubes 7, 8, capacitors 22, 23 and rectifiers 24, 25 may be considered to constitute a network having output terminals (winding 5) and two sets of input terminals (winding 12, and mid-tap-to-ground on winding 6); and that changing phase by 180 electrical degrees of voltage at one set of input terminals (by reversing switch 13) changes by 180 electrical degrees the phase of the voltage on the output terminals relative to the voltage on the other set of input terminals.

It should be noted that the speed of the motor 1 can effectively be varied by varying the magnitude of the voltage applied to the grids of tubes 7 and 8 in accordance with the teachings of my invention.

It should be further noted, respecting Fig. 2, that controlling the conduction of either tube 7 or tube 8, in effect automatically controls the current flow in the opposite direction through the respective diode 24 or 25. This is due to the operation of capacitors 22 and 23, which inherently do not pass direct currents.

I claim as my invention:

1. A network comprising a first and a second electron discharge device, each having a cathode, a control electrode and an anode, said cathodes being connected together, a coil having one end thereof connected through a first capacitor to the anode of said first device and having the other end thereof connected through a second capacitor to the anode of said second device, connections for applying a first alternating potential between a point intermediate the ends of said coil and said cathodes, connections between the cathode of said first device and the anode of said first device through a first rectifier, and connections between the cathode of said second device and the anode of said second device through a second rectifier, the anodes of said rectifiers being connected to the cathodes of said electron discharge devices, connections for applying a second alternating potential between the control electrodes and cathodes of said electron discharge devices, means for reversing at will the polarity of said second alternating potential relative to said first alternating potential, and a work circuit coupled to said coil.

2. An apparatus substantially as described in claim 1, characterized in that said rectifier connections include a resistance in series with each of said rectifiers.

3. An apparatus substantially as described in claim 1, characterized in that said work circuit comprises one phase-winding of a two-phase motor, the other phase-winding of which draws current from said first alternating potential.

4. A network comprising two pairs of back-to-back rectifiers, one rectifier of each pair having a control electrode, means for impressing alternating voltage across the anode-to-cathode path in each said pair, means to impress alternating voltages between the control-electrode and cathode of each said pair so the grid-controlled rectifier of said sets are rendered conductive in alternate half-cycles, a load-winding having its respective ends connected to like terminals of said grid-controlled rectifiers and a mid-tap connected to the other terminals thereof, and means to reverse the phase of voltages impressed on said control-electrodes, all of said alternating voltages being of the same frequency.

5. A servo-amplifier in which the load circuit specified in claim 4 is one phase-winding of a two-phase motor having its other phase-winding supplied with alternating voltage of said frequency.

6. The apparatus specified in claim 4 in which said load-winding is opaque to direct current.

References Cited in the file of this patent

UNITED STATES PATENTS

| Number | Name | Date |
| --- | --- | --- |
| 2,473,494 | Wannamaker | June 14, 1949 |
| 2,508,639 | Field | May 23, 1950 |
| 2,514,918 | Wannamaker | July 11, 1950 |
| 2,529,490 | Field | Nov. 14, 1950 |
| 2,538,494 | Barton | Jan. 16, 1951 |